(No Model.) 2 Sheets—Sheet 1.
M. JENSEN.
SOLDERING MACHINE.
No. 551,122. Patented Dec. 10, 1895.
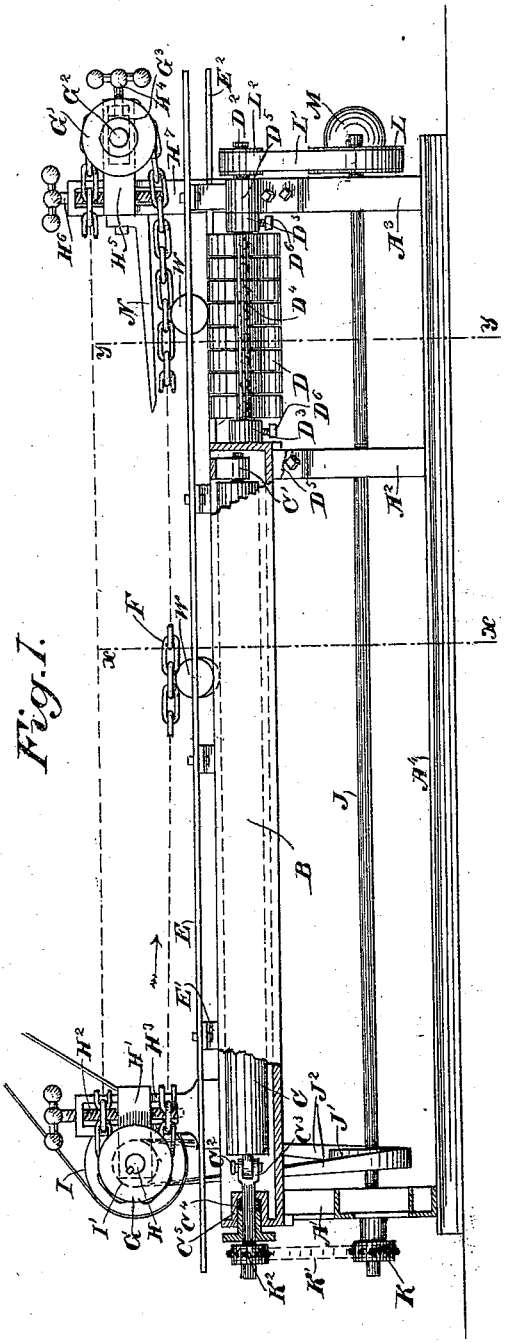
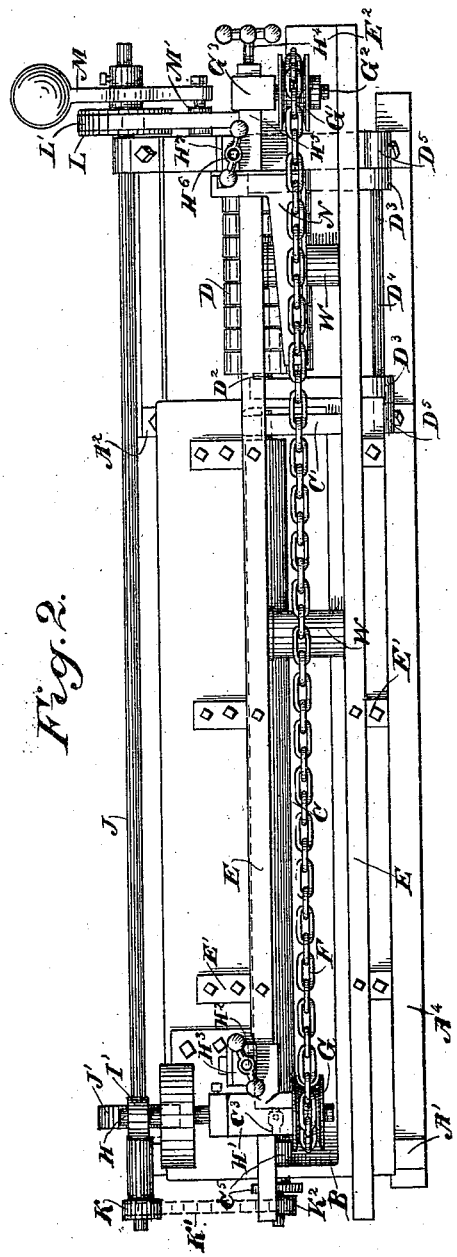
Witnesses:
Inventor,
Mathias Jensen
By Dewey & Co
Attys (No Model.) 2 Sheets—Sheet 2.

M. JENSEN.
SOLDERING MACHINE.

No. 551,122. Patented Dec. 10, 1895.

Witnesses:

Inventor,
Mathias Jensen
By Dewey & Co.
Atty

UNITED STATES PATENT OFFICE.

MATHIAS JENSEN, OF ASTORIA, OREGON, ASSIGNOR OF ONE-HALF TO THE JENSEN CAN FILLING MACHINE COMPANY.

SOLDERING-MACHINE.

SPECIFICATION forming part of Letters Patent No. 551,122, dated December 10, 1895.

Application filed May 31, 1895. Serial No. 551,293. (No model.)

*To all whom it may concern:*

Be it known that I, MATHIAS JENSEN, a citizen of the United States, residing at Astoria, Clatsop county, State of Oregon, have invented an Improvement in Soldering-Machines; and I hereby declare the following to be a full, clear, and exact description of the same.

The object of this invention is to save solder and do neat work in soldering the end seams of round cans.

The machine is of that class where the cans are rolled forward by an endless chain while soldered, but instead of submerging the seam in molten solder, as usual, the solder is applied by a revolving roller submerged in the molten solder, the same as shown and described in my Patent No. 516,308, dated March 13, 1894, and the surplus solder is removed by a revolving wiper of same construction as that shown in my Patent No. 442,484, dated December 9, 1890.

Figure 3:
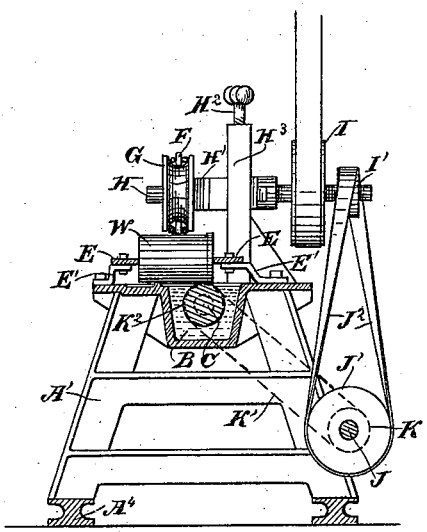
Figure 4:
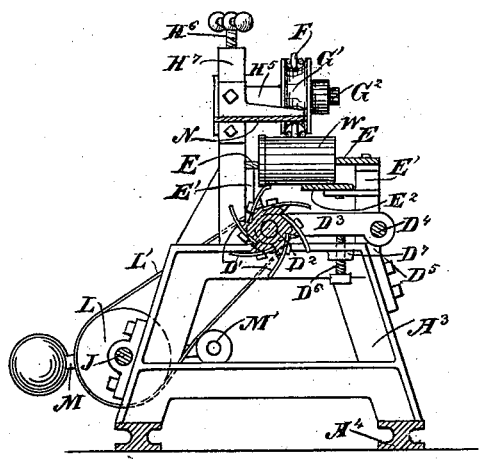

Referring to the accompanying drawings for a more complete explanation of my invention, Figure 1 is a side elevation of my machine. Fig. 2 is a plan view of the same. Fig. 3 is a vertical section on line $x\ x$ of Fig. 1. Fig. 4 is a similar section on line $y\ y$ of Fig. 1.

The frame A consists of three pairs of legs $A'$, $A^2$, and $A^3$ and two rails $A^4$, to which the legs are fastened. A trough B to contain the solder is secured on top of the legs A and $A^2$, and a roller C is mounted in said trough with one end journaled in a box $C'$ bolted to the trough, and the other end secured by a set-screw $C^2$ in a socket $C^3$, which latter has a turned stem extending through a hole in the end of the trough B, and the solder is prevented from leaking by asbestos packing $C^4$, which is held around said stem by a follower $C^5$, as shown in Figs. 2 and 1. The revolving wiper D is secured on an axle $D^2$, which is journaled in a yoke or arms $D^3$. This yoke is mounted loosely on its bolt or pin $D^4$, the latter being supported from the legs $A^2$ and $A^3$ by boxes $D^5$. The yoke rests on the end of a screw $D^6$, which is threaded through a bar $D^7$, extending between the legs $A^2$ and $A^3$ and fastened to the same. The screw $D^6$ facilitates the adjustment of the wiper to and from the cans. (See Fig. 4.)

The cans W rest on the roller C at one end and on the soldering-trough B at the other while passing over the solder, as shown in Fig. 3, and on the bar $E^2$ while passing over the wiper, as shown in Fig. 4, said bar $E^2$ being fastened to the leg $A^3$ at one end and the trough B at the other, and the cans are guided over the roller C and wiper D by the rails E, which are fastened to brackets $E'$, that are bolted to the trough B, as seen in Fig. 3. The endless chain F for rolling the cans forward over said roller and wiper is carried on two pulleys G and $G'$ at opposite ends of the machine. The pulley G is keyed to an axle H, which is journaled in a long box $H'$, and this box is held by a screw $H^2$ in the standard $H^3$, the latter being bolted to the trough B. (Shown in Figs. 1, 2, and 3.) The pulley $G'$ is loose on its pin or shaft $G^2$, which is secured in a nut $G^3$ and held by a screw $H^4$ in the arm $H^5$. The arm $H^5$ is held by a screw $H^6$ in the upright arm $H^7$, which arm extends upward from the legs $A^3$, as shown in Figs. 2, 1, and 4.

The driving-pulley I and a smaller pulley $I'$ beside the chain-pulley G are keyed to the axle or shaft H, and a long shaft J is journaled in two boxes secured to the lower part of the legs $A'$ and $A^3$. This shaft J has a pulley $J'$ secured thereon, which is connected by a belt $J^2$ to the small pulley $I'$. Upon one end of the shaft J is fastened a sprocket-wheel K, which is connected by a sprocket-chain $K'$ to another sprocket-wheel $K^2$. This sprocket-wheel is secured to the stem of the socket $C^3$, by which the roller C is revolved. (See Figs. 1 and 2.) On and near the opposite end of said long shaft J is secured a pulley L, which is connected by a belt $L'$ to a small pulley $L^2$. This pulley is secured to the axle $D^2$, to which the wiper is also secured. (See Figs. 2 and 1.) An arm M, weighted at one end and carrying a small pulley $M'$ at the other, is mounted loosely on the end of the shaft J. The weighted end holds the pulley $M'$ against the belt $L'$ and insures the required tension, while it permits the wiper to be adjusted to or from the cans. (See Figs. 2 and 4.)

An arm N is fastened to the upright arm of the legs $A^3$ and extends over the wiper close above the lower line of the chain F to prevent the wiper from throwing the cans out of place. (See Figs. 2, 1, and 4.)

The wiper should be made very flexible by light steel or rubber springs on the opposite side to its wiping-surface, and when made of ordinary cloth it should be kept damp either by a roller in water, as shown in my Patent No. 442,484, or by a light spray of steam and water. I prefer to make it with a series of leaves D' secured in rows on its periphery, as seen in Figs. 1, 2, and 4.

The solder may be heated by any of the usual modes for that purpose.

The operation will be as follows: When the driving-pulley I is revolved in direction shown by the arrow, the chain F, the roller C, and the wiper D are all actuated by the connections previously described, and when the cans arrive at the entrance of this machine they are guided so as to enter properly between the roller C and chain F. Then the latter will engage the cans and roll them forward with their end seams in contact with the upper surface of the roller C, which being submerged in molten solder and revolving will continually carry solder to the fluxed seam, which will thus be made tight. As each can leaves the roller, it is immediately engaged by the wiper, which removes the surplus solder.

The machine, as shown in the drawings, is adapted to solder only one end seam at a time; but both ends may be soldered at the same time by carrying the cans on two rollers parallel with each other.

It will be seen that the solder is applied to a much less surface of the cans by using the roller than by submerging the seam in the molten solder; also the surplus of this smaller surface may be more perfectly removed by wiper, as stated.

Having thus described my invention, what I claim as new, and desire to secure by Letters Patent, is—

1. The combination, of a frame, a solder tank extending longitudinally along the same, a rotatable roller submerged in the molten solder, and supporting one end of the can whereby the solder is applied to the end seam of the can, said can having its opposite end supported by the tank, an endless chain whose lower fold travels in contact with the upper surface of the can and causes the can to be rolled forward in a direction at right angles with the direction of rotation of the roller and means for operating the chain.

2. In a soldering machine, a frame, a tank containing molten solder, extending parallel with the length of the frame, a plain surfaced metal roller mounted in said tank, said roller rotating in the solder and having its upper surface forming a support for the end of the can to be soldered, the opposite end of the can being supported by the frame of the tank, an endless chain mounted above the tank and essentially parallel therewith, having its lower fold to travel in contact with the upper side of the can, and thereby roll the can forward along the roller and in a plane at right angles with the rotation of said roller, and means for operating the chain.

3. In a soldering machine for soldering the end seams of circular cans, the combination, of a solder trough, a plain surfaced metal roller rotating in the molten solder and having its upper part serving as a support for the end of the can having the seam to be soldered, and an endless chain above and extending parallel with the length of the roller, and receiving the can between it and the roller whereby the lower fold of the chain by resting in direct contact with the upper surface of the can rolls said can along the roller so that the solder may be delivered from the roller to the end seam of the can, and means for operating the chain.

4. In a soldering machine, a frame having a solder tank extending longitudinally along it, a plain surfaced rotatable roller extending lengthwise of the tank, a longitudinally extending endless chain above the tank and roller and forming a space or guide through which the cans pass, said chain having its lower fold bearing upon the upper side of the can while the lower side of the can is supported at its opposite ends by the top surface of the roller and upper surface of the tank respectively.

5. In a soldering machine for soldering the end seams of circular cans, a solder tank extending lengthwise of the machine, having a plain surfaced metal roller journaled in the tank so as to rotate in the solder, the opposing rails E above the tank and secured thereto, and forming a guide for the can, said rails engaging the opposite heads of the can and said roller forming an unyielding support for the under surface of the seam end of the can to be soldered, and an endless chain operating in the direction of the length of the machine, with its lower fold in contact with the upper surface of the can whereby the can is rolled forward at right angles with the direction of rotation of the roller.

6. In a soldering machine, a frame, a tank extending parallel along the upper part of the same and adapted to contain molten solder, a plain surfaced metal roller within said tank and rotating in the contents thereof, guide plates E on opposite sides of the tank forming a guide for the cans while said cans are supported from below by the roller and tank respectively, an endless chain operating in the direction of the length of the tank and frame, having its lower fold to engage the upper surface of the can body and roll the can along in a plane at right angles with the rotation of the roller whereby the latter supplies solder to the end seam, a wiper in the path of the cans for removing the surplus solder, means for rotating the roller and wiper and means for operating the chain.

7. In a soldering machine, the combination, of a revolving wiper operating in a plane at right angles with the plane of rotation of the cans, having a series of flexible leaves secured at one end, in rows on its periphery, for removing the surplus solder from the cans, and an endless chain above and extending parallel with the machine and at right angles with the rotation of the wiper, having its lower fold in contact with the top surface of the can whereby the can is rolled forward by the action of the chain, and means for operating the chain and revolving the wiper.

8. In a soldering machine, a frame, a soldering tank, a plain surfaced metal roller journaled to rotate therein with its lower portion dipping into the molten solder, opposing plates E on the tank forming guides for the ends of the can, said can being supported from below by the roller at one end and the top of the tank at the other end, a flexible wiper in line with the roller, a plate or bar $E^2$ for supporting one end of the can while passing over the wiper, means for rotating the roller and wiper and an endless chain above said roller and wiper having its lower fold to engage the upper portion of the can and roll the can along the roller and wiper in a plane at right angles with the plane of rotation of said roller and wiper.

9. In a soldering machine, the combination, of a revolving wiper, a means for supporting the can in a horizontal position above the same, an endless chain having its lower fold to engage the upper surface of the can and roll the can forward in a plane at right angles with the plane of rotation of the wiper, and a shield or arm extending over the wiper close above the lower fold of the chain, to prevent the wiper throwing the cans out of place.

10. A device for soldering can bodies, consisting of a plain surfaced metal rotating roller dipping into molten solder, guides between which can bodies are retained above and at right angles with the axis of the roller, with their end seams in contact with the top thereof, an endless chain whereby the cans are caused to roll from one end of the roller to the other, revolving flexible wipers over which the seams pass after leaving the roller, the pivoted arms carrying said wipers and the adjusting device for the arms, said wipers rotating upon an axis in line with that of the roller.

11. A device for soldering can bodies, consisting of a plain surfaced metal rotating roller dipping into molten solder, guides between which the can bodies are held above the roller with their axes at right angles thereto, and the circular end seams in contact with the top of the roller, an endless chain traveling above the can bodies and parallel with the axis of the roller whereby the can bodies are rolled along the top of the roller, a series of flexible revolving wipers rotating upon an axis in line with the axis of the roller, and over which the cans are caused to travel after leaving the roller.

12. A device for soldering can bodies consisting of a plain surfaced metal rotating roller dipping into molten solder, guides between which the cans are retained above the roller with their axes at right angles thereto, and the circular end seams in contact with the top of the roller, an endless traveling chain by which the cans are caused to roll from end to end of the roller, revolving wipers consisting of a series of flexible leaves adapted to remove the surplus solder from the seams, and having their axes of rotation in line with the axes of the roller, and an arm or bar extending above the cans, and the actuating portion of the chain whereby the cans are prevented from being lifted as they pass over the wipers.

13. In a device for soldering can bodies, a solder trough, a plain surfaced metal roller extending from end to end of said trough having one end journaled in a box or bracket within the trough, and a socket piece within which the opposite journal pin is held, a stem extending outwardly from the socket piece in line with said journal pin and passing through the end of the solder trough, a stuffing-box surrounding said stem with an indestructible packing material whereby the solder is prevented from escaping, and mechanism exterior to the pan whereby the roller is caused to rotate within the molten solder.

In witness whereof I have hereunto set my hand.

MATHIAS JENSEN.

Witnesses:
ELLA RUCKER,
G. C. FULTON.